United States Patent Office 2,759,956
Patented Aug. 21, 1956

2,759,956

RICE WAX EXTRACTION

Joseph Pominski, Henry L. E. Vix, and Paul H. Eaves, New Orleans, La., assignors to the United States of America as represented by the Secretary of Agriculture No Drawing. Application November 3, 1953,
Serial No. 390,100

14 Claims. (Cl. 260—412.8)

(Granted under Title 35, U. S. Code (1952), sec. 266)

A non-exclusive, irrevocable, royalty-free license in the invention herein described, for all governmental purposes, throughout the world, with the power to grant sub-licenses for such purposes, is hereby granted to the Government of the United States of America.

This invention relates to the production of a hard rice wax.

Rice bran contains in the order of 15 to 20% lipides. The rice bran lipides consist essentially of rice oil, wax, free fatty acids and phosphatides. As heretofore practiced, the solvent extraction of rice bran removes from about 90 to 95% of the lipides. When the oil obtained by such a solvent extraction is freed of oil solvent and allowed to stand, an oil insoluble "tank settling" precipitates. Such tank settlings amount to about 1 to 2% by weight of the oil and consist essentially of oil, a relatively soft wax fraction, free fatty acids and phosphatides.

The solid and liquid portions of such tank settlings cannot readily be separated by filtration. Dilution with liquid hydrocarbons such as hexane, heptane and the like provides little if any improvement in their filtration characteristics. However, by purification and fractional crystallization from isopropyl alcohol, a hard rice bran wax which is comparable to carnauba wax in many of its properties, can be isolated from rice bran oil tank settlings.

An object of the present invention is to provide a process of solvent extracting wax from rice bran in a manner in which a hard, essentially oil-free rice wax is isolated from the extracting solvent. Another object is to provide a process of solvent extracting the lipides from rice bran, in which process, an oil of good refining character is selectively extracted from the bran and then a hard wax is extracted from the bran. Another object is to provide a process of producing a hard wax from rice bran by a process which can be applied to the tank settlings of rice oil which was solvent extracted from rice bran which may be cooked in the defined manner prior to the solvent extraction.

In general, one variation of the present invention comprises: heating rice bran in contact with about from 14 to 35% of its weight of water at a temperature of about from 70 to 235° F. for about from 15 to 70 minutes and adjusting the moisture content of the bran, during the heating, to produce a final moisture content of at least about from 5 to 7%, and preferably to produce a final moisture content of about from 8 to 30%; contacting the so heated rice bran with a normally liquid oil solvent having a boiling point of about from 100 to 220° F., at a temperature of about from 70 to 220° F., until wax dissolves; cooling the hot wax containing miscella so formed, until an immiscible wax-rich phase, consisting essentially of rice wax, is obtained; and mechanically separating the denser phase, consisting essentially of rice wax, from the lighter phase, consisting essentially of the oil solvent, by virtue of their differences in specific gravity.

The mechanical separation of the denser phase from the lighter phase by virtue of their differences in specific gravities can suitably be accomplished by decantation or centrifugation. Centrifugation is preferred.

In one preferred embodiment of the invention the rice bran is heat treated in the manner described above; the so treated bran is contacted with the oil solvent at a temperature of about from 35 to 60° F., until a portion of the oil is selectively dissolved in the solvent; the oil rich miscella so formed is removed from contact with the rice bran; the so treated rice bran is contacted with fresh oil solvent at a temperature of about from 70 to 220° F., until wax dissolves; and the wax containing miscella is treated in the manner described above.

The proportion of the oil which is selectively extracted prior to the extraction of the wax can suitably range from 0 to 100%. Since waxes consist of complex mixtures containing many components closely resembling oils, the selective extraction of all of the oil prior to the selective extraction of the wax removes an appreciable amount of components which would ordinarily be components of the wax. The selective extraction of at least the bulk of the oil, and preferably from about 90 to 98% of the oil, prior to the extraction of the wax, is preferred.

In another preferred embodiment, the wax containing miscella is washed several times with water at a temperature of about from 70 to 220° F. The denser water solutions of water soluble components are mechanically separated from the lighter hydrocarbon solution and the water solutions are sent to a phosphatide treatment system.

In another preferred embodiment, the rice wax phase, which is mechanically isolated from the wax containing miscella after the miscella has been cooled until an oil solvent insoluble phase separates, is washed several times with a liquid hydrocarbon at a temperature of about from 35 to 70° F. The lighter hydrocarbon solutions of hydrocarbon soluble components are mechanically separated from the heavier wax phase and the hydrocarbon solutions are sent to an oil recovery system.

When the rice bran to be extracted contains less than about 14% moisture prior to the heat treatment of the bran, the moisture content can suitably be adjusted to about from 14 to 35% prior to or during the heating. The adjustment is preferably made during the initial stages of the heating. The moisture content of the rice bran is preferably adjusted to about 20% while the bran is being heated to about from 170 to 210° F. and adjusted during the subsequent heating to a moisture content of about from 8 to 30% during the final stages of the heating, at which time the temperature is rising to about from 210 to 225° F.

The extraction can suitably be conducted in a batchwise or continuous manner. Continuous operation is preferred. A wide variety of solvent extraction procedures and apparatus can suitably be used in conducting the extraction of rice wax in accordance with this invention. The procedures and apparatus described in the co-pending application of Gastrock, Vix, D'Aquin, Graci, and Spadaro, Serial No. 314,234, filed October 10, 1952, now U. S. Patent 2,727,914, issued December 20, 1955, can suitably be used. In using them, the rice bran is preferably heated as defined above, then "crisped" as defined in that patent application, and thus converted to relatively friable particles which are particularly adapted to be solvent extracted by slurrying the particles with an oil/wax solvent, supporting the rice bran particles on a filter bed and washing them with substantially separate portions of an oil solvent, in the manner defined in that patent application. The so treated rice bran particles are preferably slurried at low temperature; supported on the filter bed, then contacted first with portions of the oil solvent at the relatively low temperature range defined above and then finally with portions of the oil solvent at the relatively high temperature range, defined above, with the recycling of portions of the oil solvent being arranged to concentrate the oil in the portions which contact the rice bran particles at low temperature and with the wax being removed by cooling and centrifuging the portions of the oil solvent which contact the bran particles at the higher temperatures. The wax is preferably recovered by cooling the wax containing miscella to a temperature at which a liquid or solid phase of the wax becomes immiscible with the solvent and mechanically separating the wax in the manner defined above.

In the case of wax-rich miscellas containing from about 2 to 10% of oil, a solid phase of the wax becomes immiscible at about 35 to 60° F., temperature and centrifugation separates a hard rice wax which is suitable for many applications without further purification.

Normally liquid oil solvents boiling at about from 100 to 220° F. which can suitably be used in the present process include the commercial hexanes and heptanes, the trimethyl pentanes, the chlorinated hydrocarbon solvents and the like. The commercial hexanes are preferred.

In cooling the wax-containing miscellas, i. e., rice wax dissolved in the above liquids at about from 70 to 220° F., to a temperature at which an immiscible wax-rich phase separates the miscellas are preferably cooled at the rate of from about 2 to 4 degrees per minute.

Where a wax-containing rice oil is produced by the solvent extraction of a rice bran cooked in the manner defined above prior to the extraction, the wax contained in the oil can suitably be recovered in accordance with the present invention. The desolventized oil is allowed to settle. The waxy tank settlings are isolated and dissolved in a normally liquid oil solvent of the type defined above, at a temperature of about from 70 to 220° F. preferably using an amount of oil which becomes relatively saturated at that temperature. The wax contained in the wax containing miscella so formed is recovered in the form of a relatively hard wax by treating the miscella in accordance with this invention.

The following examples are illustrative of details of the invention. In the examples the percentages are reported on an "as is" basis, i. e., without correction for initial moisture content.

EXAMPLE 1

Rice bran was heated in contact with about 16 percent of its weight of water at about from 70 to 225° F. for about 50 minutes with the moisture content being reduced during the heating to produce a final moisture content of about 8.5 percent prior to the indicated extractions.

Using a solvent to bran ratio of 1.3 to 1, the so treated rice bran was slurried in a commercial hexane by agitating a mixture of the bran and hexane for about 30 minutes. The bran was filtered off and, supported on the filter bed, was subjected to a batchwise, filtration-extraction using three wash portions of fresh hexane; each at a temperature of about 37 to 39° F. using a contact time of about 1.5 to 4 minutes in each extraction. The lipides content of the so extracted bran was 1.36%.

A portion of the so extracted bran was re-extracted in a similar manner with hexane at about 125 to 140° F. using a slurrying time of about 46 minutes which included the time of heating the solvent and the bran. The lipides content of the so extracted bran was 0.24%. Other experiments have shown that the reslurrying is unnecessary. The cold extraction can be followed directly with hot extraction with a resulting extraction equal to or better than that obtained with reslurrying.

The wax containing miscella formed in the latter extraction was filtered at about 140° F. then cooled to about 40° F. The immiscible wax-rich phase which formed was centrifugally separated using a relative centrifugal force of about 800 times gravity.

The cool miscella was not filterable at a temperature of 38° F.

The wax obtained by the centrifugation dried to a hard wax, melting at 78.5° C. This wax was comparable to the isopropanol purified wax described in Journal of the American Oil Chemists' Society, 30, 9–14, January 1953. The yield of wax was 0.254% based on the weight of rice bran or 1.5% based on weight of oil.

The oil obtained by the above extraction at 37 to 39° F. was recovered by subjecting the miscella to filtration, concentration, and stripping in the usual manner. The refining character of this oil was compared to that obtained by subjecting similarly treated rice bran to a similar extraction and oil recovery in which the temperature during the extraction was about 85° F. and wax was not isolated from the miscella so obtained. The following table illustrates the important characteristics of the two oils. The refining losses of the oil extracted in accordance with the process of the present invention were about 25% less than those of the oil obtained by the conventional hot extraction.

*Refining data on cold extracted rice oil*

| Oil | FFA, percent | Lye, °Bé. | Refining Loss, percent | Excess Lye, percent | Lovibond Color | |
|---|---|---|---|---|---|---|
| | | | | | Refined Oil,[1] Red 70 Y | Bleached Oil,[2] Red 35 Y |
| Extracted at 38° F | 3.24 | 14 | 15.3 | 0.5 | | |
| | | 16 | 14.8 | 0.5 | | |
| | | 16 | 15.4 | 0.5 | 2.27 | 3.22 |
| Extracted at 85° F | 2.90 | 14 | 20.0 | 0.5 | 2.27 | 3.79 |
| | | 16 | 22.0 | 0.5 | 2.27 | |

[1] 1″ of oil in color tube.
[2] 1% nuchar and 5.6% B Earth, 5.25″ of oil in color tube.

EXAMPLE 2

Another portion of the heat-treated rice bran of Example 1 was similarly slurried, using an agitation time of from 30–45 minutes supported on a filter bed and subjected to a batchwise filtration-extraction using four wash portions of fresh hexane, each at a temperature from about 145 to 150° F., using a contact time of 2 to 6 minutes.

The wax containing miscella so formed was filtered at about 140° F. The hot miscella was cooled to about 40° F. The immiscible wax-rich phase which formed was centrifugally separated as described in Example 1.

The wax obtained was redissolved with fresh hexane, cooled and centrifugally separated three times to remove oil and other soluble impurities. The yield of wax was 0.26% based on the weight of the rice bran or 1.48% based on the weight of the oil. This wax was comparable to the wax described in Example 1.

EXAMPLE 3

Another portion of rice bran initially heat treated as in Example 1 was similarly slurried, using about 30 minutes agitation, supported on a filter bed and washed with fresh hexane at a temperature of about 140° F. The so extracted material was similarly reslurried and washed, two times, to make a total of three slurryings.

The wax containing miscella so formed was washed with water at a temperature of about 140° F. The hot water washed miscella was cooled to about 40° F. (at a rate of about 3° per minute) and allowed to settle. The immiscible wax-rich phase which formed was washed three times by resuspending it in hexane and cooling and settling each of the suspensions. The yield of wax was 0.22% based on the weight of the rice bran or 1.29% based on the weight of the oil. The wax was comparable to the wax described in the preceding examples.

EXAMPLE 4

This example illustrates the recovery of wax from rice bran which has not been initially cooked as in Examples 1 to 3.

A portion of raw rice bran was similarly slurried, using about 30 minutes agitation, supported on a filter bed and washed with fresh hexane at a temperature of about 140° F. The so extracted material was similarly reslurried, and washed, two times, to make a total of three slurryings. The wax containing miscella so formed was washed with water at a temperature of about 140° F. (the water washing improves the yield of wax and removes phosphatides). The hot water washed miscella was cooled to about 40° F. (at a rate of about 3° per minute) and allowed to settle. The immiscible wax-rich phase which formed was washed three times by resuspending it in hexane and cooling and settling each of the suspensions. The yield of wax was 0.31% based on the weight of the rice bran or 1.82% based on the weight of the oil. The wax was comparable to the wax described in the preceding examples.

When raw rice bran is contacted with the oil solvent at a temperature of about from 35 to 60° F., until a portion of the oil is selectively dissolved in the solvent; the oil rich miscella so formed is removed from contact with the rice bran; the so treated rice bran is contacted with fresh oil solvent at a temperature of about from 70 to 220° F., until wax dissolves; and the wax containing miscella is treated in the manner described above, the recovery of wax is improved.

EXAMPLE 5

Filtration extractions were conducted on cooked meal previously extracted at 40° F. and maintained at about 40° F. Table 1 shows the mass velocities and residual lipides obtained. The low lipids obtained indicate that the wax can suitably be removed without reslurrying. The high mass velocities obtained indicate the practicability of extracting the wax without reslurrying. A temperature as low as 91.4° F. may be used in the "hot" solvent extraction of previously "cold" solvent extracted rice bran.

*Table I*

| | 40° F. Extraction | | | | Hot Extraction | | | | | | |
|---|---|---|---|---|---|---|---|---|---|---|---|
| | | Mass Velocity, #/ft.²/hr. | Analyses | | | Extraction or Wash Temp., °F. | Washes, No. | Final Cake Temp., °F. | Mass Velocity, #/ft.²/hr. | Analyses | |
| Extraction Temp., °F. | Washes, No. | | H₂O, Percent | Lipids, Percent | Reslurry | | | | | H₂O, Percent | Lipids, Percent |
| 41 | 2 | 2,555 | 8.5 | 2.53 | No | 145 | 2 | 131 | 4,040 | 8.8 | 0.51 |
| | | | | | No | 158 | 3 | 135 | 3,480 | 8.7 | 0.38 |
| | | | | | Yes | 136 | 3 | 133 | 3,850 | 8.3 | 0.25 |
| 39 | 3 | 2,875 | 8.9 | 1.34 | No | 91 | 3 | 87 | 1,470 | 8.7 | 0.36 |
| | | | | | No | 142 | 3 | 131 | 1,840 | 8.4 | 0.17 |
| | | | | | No | 154 | 3 | 142 | 1,580 | 8.5 | 0.25 |
| | | | | | Yes | 147 | 3 | 137 | 2,230 | 8.3 | 0.12 |
| | | | | | Yes | 140 | 2 | | 1,900 | 9.7 | 0.25 |

We claim:

1. A process for extracting rice bran wax which comprises: heating rice bran in contact with about from 14 to 35% of its weight of water at about from 170 to 235° F. for about from 15 to 70 minutes; adjusting the moisture content of the bran during the heating to produce a final moisture content of at least 5%; contacting the so heated rice bran at a temperature of about from 70° to 220° F. until rice bran wax dissolves with a normally liquid oil solvent having a boiling point of about from 100° to 220° F., cooling the hot wax containing miscella so formed until an immiscible wax-rich phase, consisting essentially of rice bran wax, is formed; and centrifugally separating the wax-rich phase from the phase consisting essentially of the solvent.

2. A process for extracting rice bran wax which comprises: heating rice bran in contact with about from 14 to 35% of its weight of water at about from 170° F. to 235° F. for about from 15 to 70 minutes; adjusting the moisture content of the bran during the heating to produce a final moisture content of at least 5%; contacting the so heated rice bran at a temperature of about from 35° to 60° F. with a portion of a normally liquid oil solvent having a boiling point of about from 100° to 200° F. until a portion of the rice oil is selectively dissolved and desolventizing it to obtain by-product rice oil; isolating the oil-rich miscella so formed; and contacting the remaining rice bran with a fresh portion of solvent at a temperature of about from 70° to 220° F. to dissolve rice wax; cooling the hot wax containing miscella so formed until an immiscible wax-rich phase, consisting essentially of rice bran wax, is formed; and centrifugally separating the wax-rich phase from the phase consisting essentially of solvent.

3. A process for extracting rice bran wax which comprises: heating rice bran in contact with about from 14 to 35% of its weight of water for about from 15 to 70 minutes at a temperature of about from 170 to 235° F.; adjusting the moisture content of the rice bran being heated to a final moisture content of about from 8 to 30%; contacting the so-heated rice bran with hexane at a temperature of about from 145 to 150° F. until wax dissolves; cooling the hot wax containing miscella so formed, at a rate of about from 2 to 4 degrees per minute, until an immiscible wax-rich phase is formed; centrifugally separating the wax-rich phase from the phase consisting essentially of hexane; and mixing the wax-rich phase with, and centrifugally separating it from hexane a plurality of times, to remove traces of hexane soluble components from the wax-rich phase.

4. A process for extracting rice bran wax which comprises: heating rice bran in contact with about from 14 to 35% of its weight of water for about from 15 to 70 minutes at a temperature of about from 170° to 235° F.; adjusting the moisture content of the rice bran being heated to a final moisture content of about from 8 to 30%; contacting the so-heated rice bran with hexane at a temperature of about from 70° to 220° F. until rice bran wax dissolves; cooling the hot wax-containing miscella so formed until an immiscible wax-rich phase, consisting essentially of rice bran wax, is formed; and centrifugally separating the wax-rich phase from the phase consisting essentially of hexane.

5. A process for extracting rice bran wax which comprises: heating rice bran in contact with about from 14 to 35% of its weight of water for about from 15 to 70 minutes at a temperature of about from 170° to 235° F.; adjusting the moisture content of the rice bran being heated to a final moisture content of about from 8 to 30%; contacting the so-heated rice bran with hexane at a temperature of about from 145° to 150° F. until wax dissolves; desolventizing the wax-containing miscella so formed; settling the desolventized wax-containing rice bran oil until an immiscible wax-rich phase forms; centrifugally separating the wax-rich phase and dissolving it in enough hexane to form a relatively saturated solution at temperatures of about from 145° to 150° F.; cooling the hot wax-containing miscella so formed to produce an immiscible wax-rich phase; and centrifugally separating the wax-rich phase from the phase consisting essentially of hexane.

6. A process for extracting rice bran wax which comprises: contacting rice bran at a temperature of about from 70° to 220° F. with a normally liquid oil solvent having a boiling point of about from 100° to 220° F. until rice bran wax dissolves; cooling the hot wax containing miscella so formed until an immiscible wax-rich phase, consisting essentially of rice bran wax, is formed; and centrifugally separating the wax-rich phase from the phase consisting essentially of solvent.

7. The process of claim 6 in which the oil solvent is hexane.

8. A process for extracting rice bran wax which comprises: heating rice bran in contact with about from 14 to 35% of its weight of water at about from 170° F. to 235° F. for about from 15 to 70 minutes; adjusting the moisture content of the bran during the heating to produce a final moisture content of about 8 to 30%; extracting the so heated rice bran with hexane at a temperature of about 145° F.; washing the so formed wax-containing miscella with water at a temperature of about 140° F.; cooling the washed miscella to about 40° F. to produce an immiscible wax-rich phase; centrifugally separating said wax-rich phase from the supernatant oil phase; dissolving the wax phase in hexane; cooling the solution to produce an immiscible wax-rich phase; and centrifugally separating said wax-rich phase from the supernatant hexane phase.

9. The process of claim 1 in which the hot wax containing miscella is cooled at a rate of about 2° to 4° per minute.

10. The process of claim 2 in which the hot wax containing miscella is cooled at a rate of about 2° to 4° per minute.

11. The process of claim 4 in which the hot wax containing miscella is cooled at a rate of about 2° to 4° per minute.

12. The process of claim 6 in which the hot wax containing miscella is cooled at a rate of about 2° to 4° per minute.

13. The process of claim 8 in which the washed miscella is cooled at a rate of about 2° to 4° per minute.

14. The process of claim 8 in which the hexane-dissolved wax phase is cooled at a rate of about 2° to 4° per minute.

References Cited in the file of this patent

UNITED STATES PATENTS

| | | |
|---|---|---|
| 2,381,420 | Balch | Aug. 7, 1945 |
| 2,428,813 | Rhodes et al. | Oct. 14, 1947 |
| 2,448,729 | Ozai-Durrani | Sept. 7, 1948 |
| 2,452,093 | Balch | Oct. 26, 1948 |
| 2,456,655 | Swenson | Dec. 21, 1948 |
| 2,577,587 | Merz | Dec. 4, 1951 |

OTHER REFERENCES

Balch: Wax and Fatty Byproducts from Sugarcane, Sugar Research Foundation, Inc., New York, October 1947, pages 19–23.